US00RE36316E

United States Patent [19]

Cunningham

[11] E Patent Number: Re. 36,316

[45] Reissued Date of Patent: Sep. 28, 1999

[54] INCANDESCENT ILLUMINATION SYSTEM

[75] Inventor: David W. Cunningham, Los Angeles, Calif.

[73] Assignee: Gregory Esakoff, Huntington Beach, Calif.; a part interest

[21] Appl. No.: 08/545,934

[22] Filed: Oct. 20, 1995

Related U.S. Patent Documents

Reissue of:

[64] Patent No.: 5,268,613
Issued: Dec. 7, 1993
Appl. No.: 07/724,841
Filed: Jul. 2, 1991

[51] Int. Cl.[6] ..... H01K 1/14; H01K 1/28

[52] U.S. Cl. ..... 313/113; 313/272; 313/273

[58] Field of Search ..... 313/313, 273, 313/316, 344, 113

[56] References Cited

U.S. PATENT DOCUMENTS

| | | | |
|---|---|---|---|
| 1,237,611 | 8/1917 | Brownlee . | |
| 1,313,857 | 8/1919 | Dennington | 313/315 |
| 1,634,528 | 7/1927 | Wood . | |
| 1,651,431 | 12/1927 | Wood . | |
| 1,678,092 | 7/1928 | Wood . | |
| 1,678,093 | 7/1928 | Wood | 313/316 X |
| 1,953,456 | 4/1934 | Allen . | |
| 1,985,915 | 1/1935 | Chelioti | 313/572 |
| 2,592,102 | 4/1952 | Alexander | 313/113 X |
| 2,605,440 | 7/1952 | Gero . | |
| 3,364,377 | 1/1968 | de Nygorden et al. | 313/272 |
| 4,918,354 | 4/1990 | Johnson, Jr. | 313/279 |

*Primary Examiner*—Ashok Patel
*Attorney, Agent, or Firm*—Sheppard, Mullin, Richter & Hampton LLP; James R. Brueggemann

[57] ABSTRACT

An improved incandescent lamp is disclosed that is specially adapted for use in combination with a concave reflector in providing a high-intensity beam of light. The lamp includes a plurality of linear, helically-wound filaments arranged with their longitudinal axes parallel with each other and spaced substantially uniformly around the lamp's central longitudinal axis. Orienting such a lamp with its longitudinal axis aligned with the reflector's longitudinal axis, and with the filaments near the reflector's general focal point, ensures that a high proportion of the emitted light is collected by the reflector to project the high-intensity beam.

17 Claims, 4 Drawing Sheets

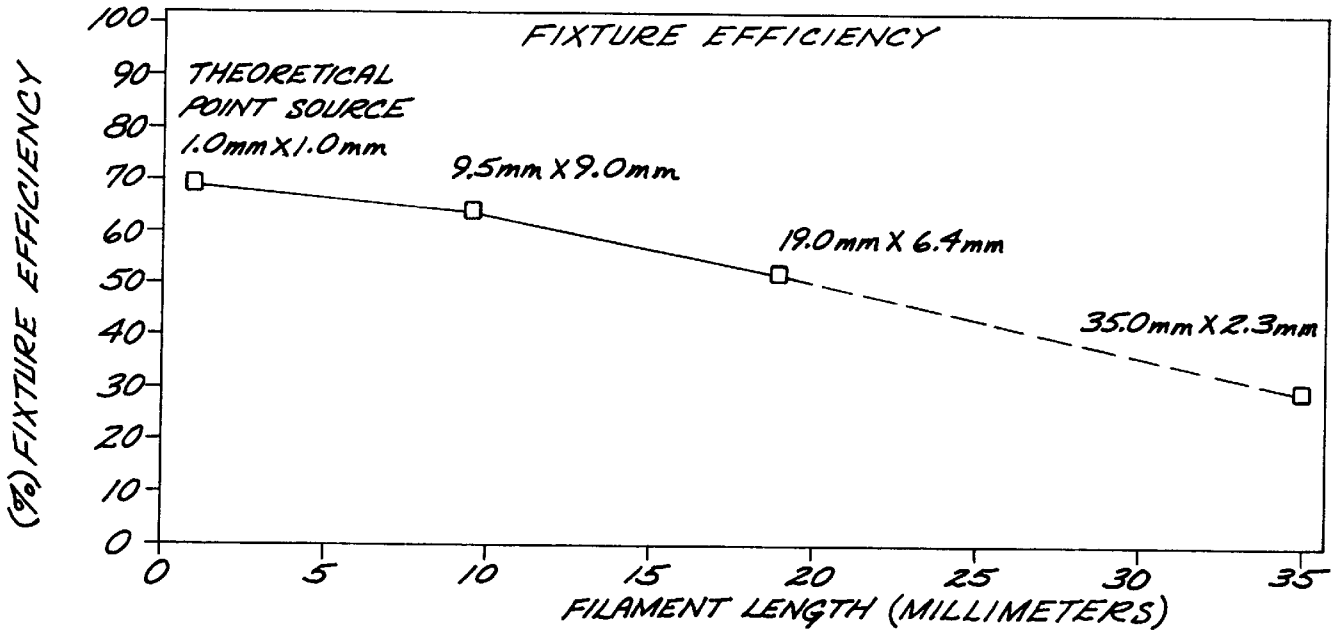
FIG. 5
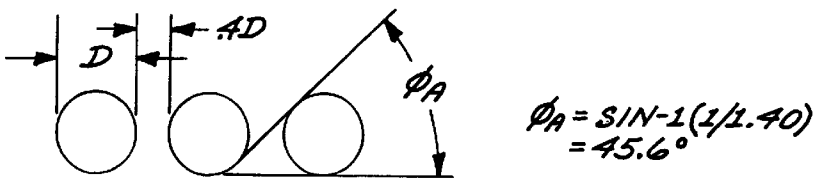
FIG. 6A C8 FILAMENT W/140% PITCH
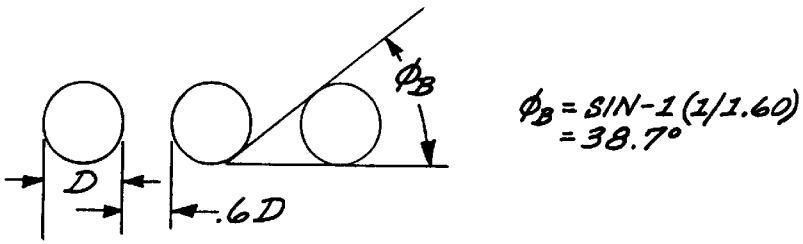
FIG. 6B C8 FILAMENT W/160% PITCH 29'
63
69
25c'
71
55
27'
13'
23'
31b'
65
57
25a'
67
25b'
59
61
53
31a'

29'
57
25c'
59
27'
13'
23'
31b'
25b'

57
25c'
23'
27'
13'
25a'
25b'

75
19
73
13
25
23

INCANDESCENT ILLUMINATION SYSTEM

Matter enclosed in heavy brackets [ ] appears in the original patent but forms no part of this reissue specification; matter printed in italics indicates the additions made by reissue.

BACKGROUND OF THE INVENTION

This invention relates generally to incandescent illumination systems or fixtures and, more particularly, to incandescent lamps adapted for use in combination with a concave reflector in collecting a high proportion of the emitted light and projecting a high-intensity beam.

Incandescent lamps of this particular kind are useful in theater, television, architectural, and general purpose lighting fixtures that provide high-intensity beams of light. In such fixtures, it is desirable to collect as high a percentage of the emitted light as possible and to redirect that collected light as a high-intensity beam having a desired intensity distribution.

Incandescent lamps of this kind commonly are used in combination with ellipsoid or near-ellipsoidal reflectors. The lamps are positioned with their light-emitting filaments located at or near a general focal point close to the reflector, such that emitted light impinging on the reflector is redirected through a gate to a lens that then projects the high-intensity beam.

Alternatively, such lamps can be used in combination with parabolic or near-parabolic reflectors. The lamp is positioned with its filaments at or near the reflector's general focal point such that emitted light impinging on the reflector is redirected to form the projected beam without the need for a lens. However, a lens sometimes is used to alter the projected beam's divergence or spread or to integrate the beam and thereby provide a desired intensity distribution.

Incandescent lamps used in illumination systems of this kind typically have included a filament in the form of a large coiled coil having a longitudinal axis. The filament typically is oriented with its major axis parallel with the axis of an ellipsoidal reflector or perpendicular to the axis of a parabolic reflector.

Other incandescent lamps used in illumination systems of this kind have included a plurality of linear, helically-wound coils arranged in one or two parallel rows that form a light-emitting plane. These lamps typically have been used in combination with a spherical reflector, with their light-emitting plane facing away from, and toward, the reflector. Forwardly-emitted light is redirected by a lens to produce the high-intensity beam, while rearwardly-directed light is redirected by the reflector back toward the filaments, where it either is reabsorbed or is passed through the filaments to the lens to become part of the projected beam.

The incandescent lamps described briefly above have proven to be generally satisfactory for use in combination with concave reflectors in providing high-intensity beams of light. However, it is believed that these lamps are configured such that an excessively high proportion of their emitted light is not being collected and included in the projected beam. The wasted light either is emitted in directions not impinging on the reflector or is redirected by the reflector in undesired directions. This wasted light not only results in the projection of a beam of lower-intensity, but also requires that excess heat be dissipated and that additional, unused power be supplied to the lamp. This inefficiency also leads to the need for illumination systems or fixtures that are physically larger in size than is believed to be necessary.

It should, therefore, be appreciated that there is a need for an incandescent lamp having an improved arrangement of filaments such that the lamp can be used in combination with a concave reflector to project a high-intensity beam with a higher collection efficiency. The present invention fulfills this need.

SUMMARY OF THE INVENTION

The present invention is embodied in an incandescent lamp adapted for use in combination with a concave reflector in producing a high-intensity beam of light that utilizes a higher proportion of the light emitted by the lamp, i.e., that provides a higher collection efficiency. The incandescent lamp includes a plurality of linear, helically-wound filaments arranged with their longitudinal axes substantially parallel with each other. The concave reflector with which the incandescent lamp is adapted for use is generally symmetrical about a longitudinal axis and has a focal point or region approximately coincident with that axis. In accordance with the invention, the plurality of filaments of the incandescent lamp are arranged with their longitudinal axes spaced substantially symmetrically about a central longitudinal axis, and the lamp is positioned with its central longitudinal axis aligned with the reflector's longitudinal axis, near the reflector's general focal point or region. This ensures that a high proportion of emitted light impinges on the reflector and is thereby redirected into the projected beam.

The filaments are arranged such that as high a proportion of light as possible is emitted generally perpendicular to the lamp's longitudinal axis, such that it is directed toward the reflector, rather than rearwardly, toward the lamp base, or forwardly, beyond the reflector. Achieving this goal is enhanced by reducing the spacing between adjacent coils of each linear filament to a minimum value without risk of arcing and by minimizing the linear length of each filament.

In one embodiment of the invention, the incandescent lamp includes four linear, helically-wound filaments arranged in a substantially square pattern symmetrically around the lamp's central longitudinal axis. The four filaments are electrically arranged in series with each other, with the first and last series-connected filaments being physically arranged diagonally opposite each other in the substantially square pattern, for maximum dielectric spacing. In an alternative embodiment, three such filaments are provided, being arranged in a substantially equilateral triangle pattern symmetrically around the lamp's central longitudinal axis. In both such embodiments, the linear, helically-wound filaments all have a substantially uniform diameter and are positioned as closely as possible to each other without risk of arcing.

In a more detailed feature of the invention, the plurality of filaments all have substantially equal lengths and are arranged with their respective ends in the same longitudinal locations. In addition, the maximum transverse diagonal distance across the plurality filaments is generally the same as the lengths of the filaments along their longitudinal axes.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

FIG. 5 is a graph showing the relationship between the illumination system's collection efficiency and filament length.

FIGS. 6A and 6B are schematic cross-sectional views of several adjacent coils of a filament with coils that are relatively widely spaced (FIG. 6B and a filament with coils that are relatively narrowly spaced (FIG. 6A), showing how light emission is narrowed in accordance with that spacing.

DESCRIPTION OF THE PREFERRED EMBODIMENTS

Figure 1:
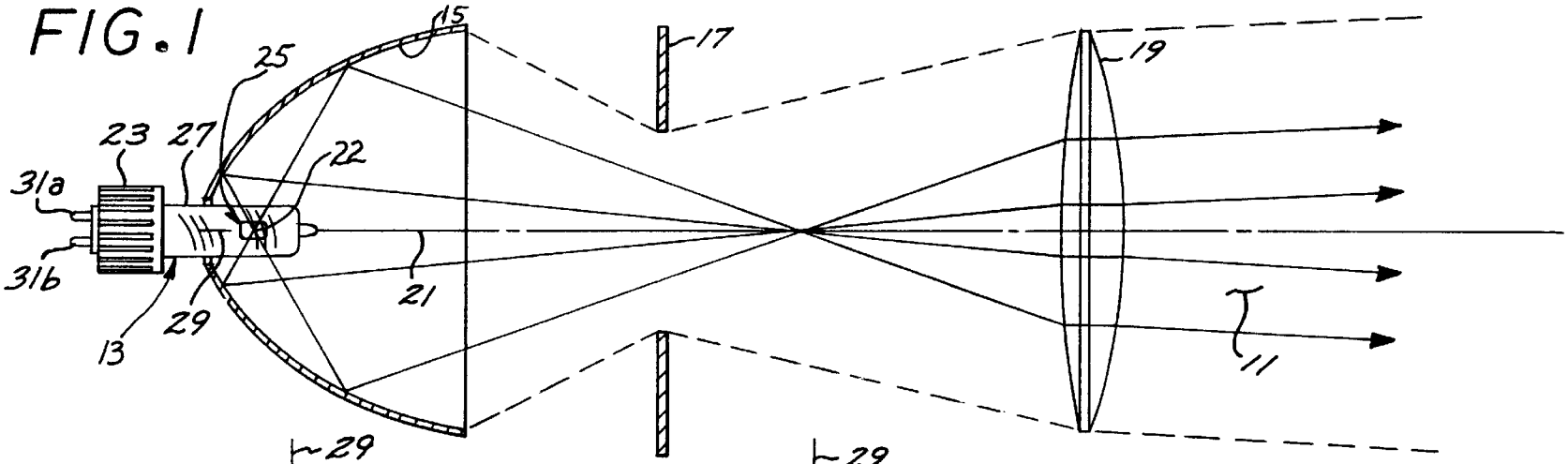
FIG. 1 is a schematic diagram of a first embodiment of an incandescent illumination system or fixture in accordance with the invention, including an incandescent lamp, a near-ellipsoidal reflector, a gate, and a collimating lens.

With reference now to the drawings, and particularly to FIG. 1, there is shown schematically an incandescent illumination system for providing a high-intensity collimated beam of light 11. The system includes an incandescent lamp 13, a concave reflector 15, an aperture stop or gate 17, and a lens 19. The reflector is generally ellipsoidal in shape, with a central longitudinal axis 21 and with a focal point or focal region 22 that it encircles. The incandescent lamp includes a base 23 having means for securing it to a part of the reflector, with the lamp's longitudinal axis aligned with the reflector's longitudinal axis and with the lamp's light-emitting filaments 25 being positioned close to the reflector's focal point. A substantial portion of light emitted by the filaments projects radially outwardly, generally perpendicular to the reflector's longitudinal axis, to impinge on the reflector and be redirected generally forwardly through the gate to the lens. The lens is positioned with its focal point approximately at the gate such that the projected beam has an intensity distribution corresponding generally with the intensity distribution at the gate.

The incandescent lamp 13 is preferably positioned relative to the reflector 15 with its filaments 25 as close to the reflector's general focal point 22 as possible. To the extent that the filaments are spaced away from that focal point, the light reflected by the reflector is more likely not to pass through the aperture of the gate 17 or otherwise is more likely to miss the lens 19 and thereby not be incorporated into the projected beam 11. Although the reflector is generally circumferentially symmetrical, its reflective surface is locally irregular, to better integrate the reflected light and thereby provide the projected beam with a more circumferentially-uniform intensity distribution. In addition, the reflector's general shape is preferably adjusted to provide a substantial cosine distribution of light passing through the gate aperture.

In the past, incandescent lamps of this kind have included filaments in the form of linear, helically-wound coils arranged in various geometric patterns. Generally, an unduly high proportion of the light emitted by prior lamps has been misdirected so as not to be included in the projected beam.

In the incandescent lamp 13 of the invention, a greater proportion of emitted light is collected into the projected beam 11 by providing the lamp with a plurality of linear, helically-wound filaments arranged with their longitudinal axes substantially parallel with, and spaced substantially symmetrically around, the concave reflector's longitudinal axis 21. By this arrangement, a greater proportion of the total emitted light is caused to impinge on the reflector and be redirected through the aperture of the gate 17 to the lens 19. With significantly less light thereby being wasted and dissipated as heat, the various optical components all can be substantially reduced in size, leading to substantial cost savings. Alternatively, without increasing the sizes of the various components, a beam of substantially higher intensity can be projected.

Figure 2C:
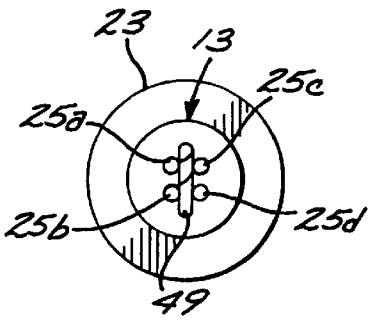
FIGS. 2A, 2B and 2C are front, side and top views, respectively, of a first embodiment of an incandescent lamp in accordance with the invention, this embodiment including four linear, helically-wound filaments.
Figure 2B:
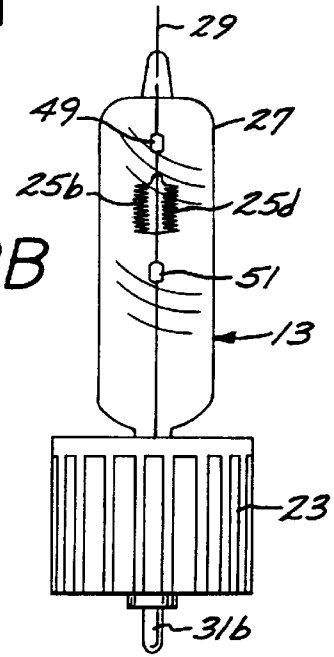
Figure 2A:
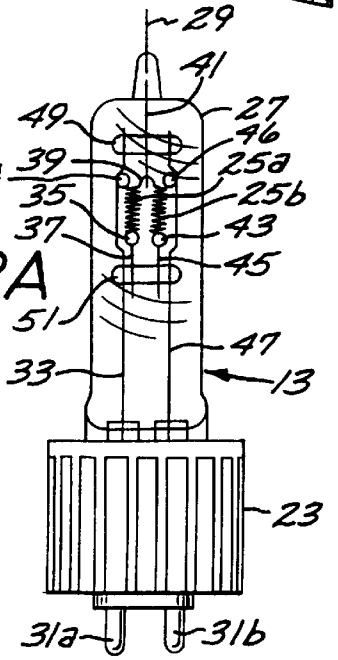

With reference now to FIGS. 2A, 2B and 2C, there is shown a first embodiment of an incandescent lamp 13 that is constructed in accordance with the invention. In addition to the base 23, the lamp further includes a circumferentially-symmetrical, transparent glass bulb 27 that defines an elongated, closed chamber in which are located four linear, helically-wound filaments 25a–25d. The longitudinal axes of the filaments are arranged to be substantially parallel with each other, in a substantially square pattern around the lamp's central longitudinal axis 29. In use, the lamp is advantageously used with its central longitudinal axis 29 aligned with the longitudinal axis 21 of the concave reflector 15 (FIG. 1).

When an electrical current is supplied to the filaments 25a–25d of the lamp 13, via electrical terminals 31a and 31b, every segment of the filaments will incandesce. Because of the filament's special geometric arrangement, the great majority of the emitted incandescent light either is directed toward the concave reflector 15 or is reabsorbed by the filaments themselves.

Figure 3:
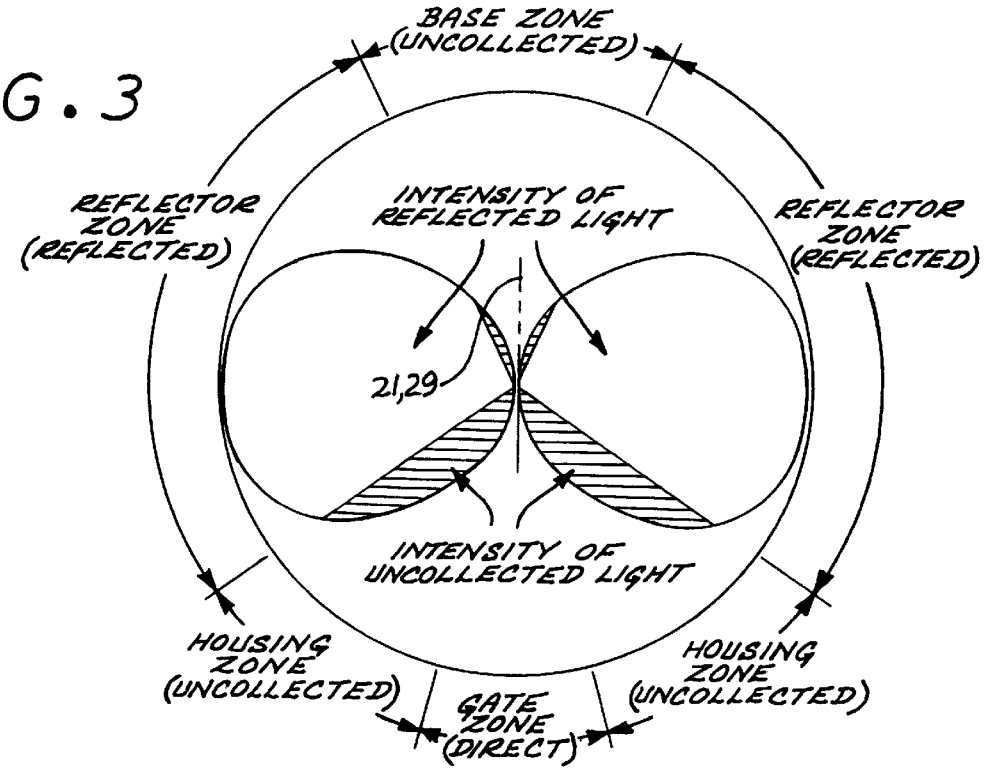
FIG. 3 is a polar graph depicting the intensity distribution of light emitted by the lamp of FIGS. 2A, 2B and 2C in a plane that includes the lamp's longitudinal axis.

This result is depicted graphically in FIG. 3, which depicts the intensity distribution of light emitted in a plane aligned with the co-linear lamp axis 29 and reflector axis 21. A high light intensity is provided in directions transverse to the longitudinal axes, because a high proportion of the filaments is visible in those directions. Conversely, a very low intensity is provided in generally longitudinal directions, because proportionately less of each filament is visible in those directions. It will be observed that the great majority of the emitted light is directed toward some portion of the reflector 15, whereas very little of the emitted light is directed rearwardly toward the lamp base 23, or forwardly, beyond the reflector but not through the aperture of the gate 17.

With reference again to FIGS. 2A, 2B and 2C, the filaments 25a–25b all have a substantially uniform diameter along their entire lengths. Each filament is separated from its two adjacent filaments by a distance substantially the same as that diameter, although as small a spacing as possible is desired, without creating a problem of arcing. In addition, the filaments are all of substantially equal length and the transverse diagonal distance across them is substantially equal to that length. A compact arrangement is thereby provided.

Figure 4A:
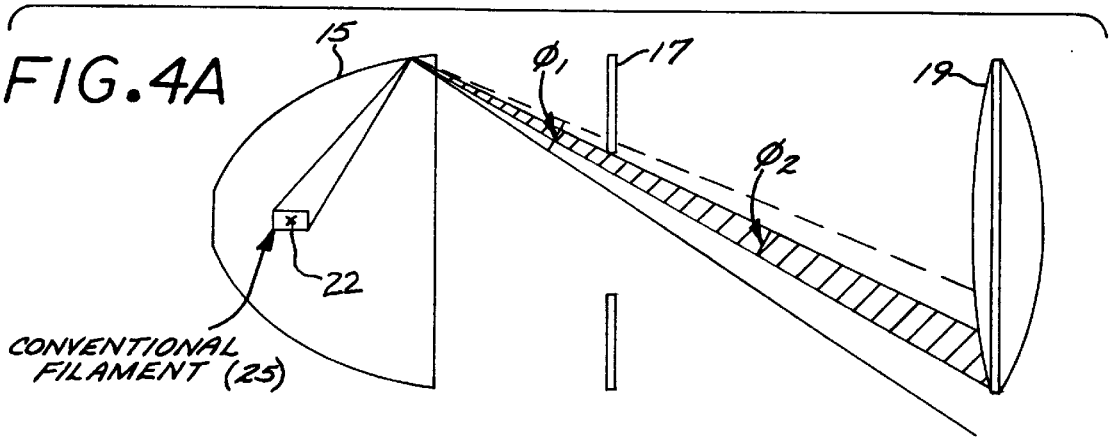
FIGS. 4A and 4B are schematic diagrams similar to FIG. 1, but showing light ray tracing from the filament to one location on the reflector for a relatively long filament (FIG. 4A) and a relatively short filament (FIG. 4B).
Figure 4B:
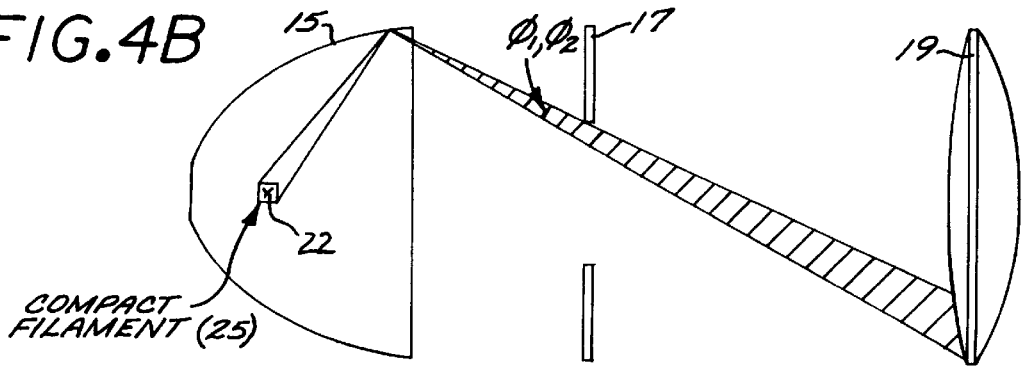

FIGS. 4A and 4B are schematic diagrams that show how the illumination system's collection efficiency varies depending on the length and inter-filament spacing of filaments 25a–25d. FIG. 4(A) shows a system with filaments that are relatively long, and FIG. 4(B) shows a system with filaments that are relatively short. In both figures, the filaments are depicted as a filament box, and light emitted from the two extreme ends of the filament box is shown impinging on a single point of the concave reflector 15.

In FIG. 4A, the light diverges by a substantial angle $\phi_1$ from the depicted point of impingement on the reflector 15. Because of this large divergence, only a small angular portion $\phi_2$ passes through the aperture of the gate 17 and reaches the lens 19. A substantial portion of the reflected light, i.e., $\phi_1-\phi_2$, either fails to pass through the gate aperture or otherwise fails to reach the lens. It will be appreciated that a similar divergence pattern will occur at all points on the reflector.

In FIG. 4B, on the other hand, the light diverges by only a small angle $\phi_1$ from the depicted point of impingement on the reflector 15. With this limited divergence, all of the light passes through the gate 17 and reaches the lens 19. It thus will be appreciated that a shorter filament will yield reduced divergence and therefore a greater collection efficiency.

FIG. 5 is a graph showing how efficiency declines as a direct function of filament length. Maximum efficiency is provided by a minimum-length filament. It will be noted in the graph that collection efficiency never reaches 100 percent, even for a filament of zero length, because of absorption and non-specular reflection by the reflector 15 and because a portion of the emitted light still will be directed rearwardly, toward the lamp base 23, or forwardly, beyond the reflector but not through the aperture of the gate 17. The graph represents data collected for an aluminum reflector having a diameter of 150 millimeters.

Another feature of the incandescent lamp 13 that functions to increase the illumination system's efficiency is a reduction in the physical spacing of adjacent loops of each filament 25. This has the effect of causing a greater proportion of the light to be emitted in directions generally perpendicular to the lamp's longitudinal axis 29, which is toward the reflector 15.

This effect can readily be appreciated with reference to FIGS. 6A and 6B, which depict partial cross-sectional views of filaments with narrowly-spaced coils (FIG. 6A) and widely-spaced coils (FIG. 6B). Ideally, the spacing between adjacent coils is reduced to a distance just beyond a distance at which arcing can occur. It will be appreciated that as the coil spacing reduces, a narrower range of light emitted by each coil will project outwardly without impinging on, and being absorbed by, the two adjacent coils. The angle of absorbed light for narrowly-spaced coils ($\phi_A$ in FIG. 6A) is greater than the angle of absorbed light for widely-spaced coils ($\phi_B$ in FIG. 6B). Light energy absorbed by an adjacent coil is primarily absorbed and then re-emitted by that adjacent coil, with a certain proportion of that re-emitted light following a desired path toward the reflector 15. The second coil thus masks the first coil and prevents emitted light from traveling in undesired directions.

Reducing the inter-coil spacing also has the concomitant advantage of shortening the filament's axial length. As discussed in detail above, this brings all points on the filament closer to the reflector's focal point or focal region and thereby increases the illumination system's collection efficiency for that reason, as well. Filaments having a pitch on the order of 140 percent (depicted in FIG. 6A) or less, in which the inter-coil spacing is about 40 percent or less of the wire diameter, are believed to provide an emission pattern that leads to a very high collection efficiency.

The four filaments 25a–25d of the incandescent lamp 13 are shown to be electrically connected in series with each other. The two filaments 25a and 25d, between which the greatest voltage drop arises are arranged to be diagonally opposite each other so as to reduce the possibility of arcing.

The filaments 25a–25d are all formed from a single, continuous wire and are held in their desired positions by several support wires and bridge blocks. In particular, a first lead-in wire segment 33, which forms one end of the continuous filament wire, electrically connects the lamp's first electrical terminal 31a through a loop 34 to the upper end of the filament 25a. An interconnect wire segment 35, which is supported by a support wire 37, electrically connects the lower end of the filament 25a with the lower end of the filament 25b. An interconnect wire 39, which is supported by a support wire 41, electrically connects the upper end of the filament 25b with the upper end of the filament 25c. Further, an interconnect wire 43, which is supported by a support wire 45, electrically connects the lower end of the filament 25c with the lower end of the filament 25d. Finally, the upper end of the filament 25d is electrically connected through a loop 46 and a lead-in wire 47 to the lamp's second electrical terminal 31b. An upper transverse support or bridge block 49 secures in place the lead-in wires 33 and 47 and the support wire 41, while a lower bridge block 51 secures in place the lead-in wires 33 and 47 and the support wires 37 and 45.

Figures 7A, 7B, 7C, 8:
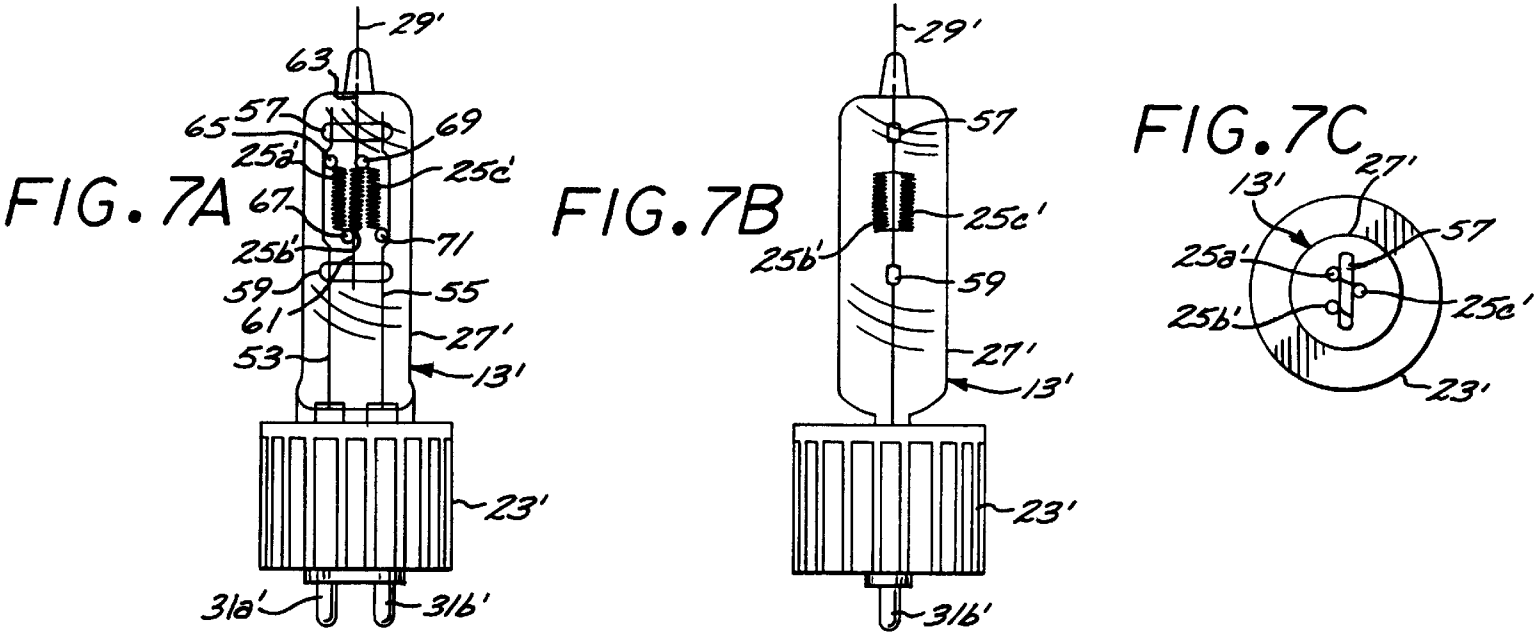
FIGS. 7A, 7B and 7C are front, side and top views, respectively, of a second embodiment of an incandescent lamp in accordance with the invention, this embodiment including three linear, helically-wound filaments.
FIG. 8 is a schematic diagram of an alternative embodiment of an incandescent illumination system or fixture in accordance with the invention, this system including an incandescent lamp, a near-parabolic reflector, and an optional lens.

FIGS. 7A, 7B and 7C depict a second embodiment of an incandescent lamp 13' in accordance with the invention. This lamp includes just three linear, helically-wound filaments, designated 25a'–25c'. The filaments are arranged in a generally equilateral triangular pattern around the lamp's longitudinal axis 29'. As with the first lamp embodiment 13, the filaments of this lamp 13' all have a substantially uniform diameter and are separated from each other by a distance corresponding generally to that diameter, although as small a spacing as possible is desired. In addition, the transverse distance across the filaments, i.e., in a plane perpendicular to the lamp's longitudinal axis 29', is preferably substantially equal to the uniform lengths of the filaments. This provides a compact filament structure that results in a highly efficient illumination system that provides a high-intensity beam.

The three-filament lamp 13' includes a support structure that includes two lead-in wires 53 and 55, two bridge blocks 57 and 59, and two support wires 61 and 63. The lead-in wires 53 and 55 are electrically connected to the respective two terminals 31a' and 31b', and the lower and upper bridge blocks are secured at selected locations on the two lead-in wires. An interconnect wire loop 65 interconnects the first lead-in wire 53 with the upper end of the filament 25a'. An interconnect wire 67 electrically connects the lower end of the filament 25a' with the lower end of the filament 25b', being supported by a support wire 61 projecting upwardly from the lower bridge block 59. Similarly, an interconnect wire 69 electrically connects the upper end of the filament 25b' by a support wire 63 projecting downwardly from the upper bridge block 57. Finally, an interconnect wire loop 71 electrically connects the lower end of the filament 25c' with the lead-in wire 55. The upper bridge block 57 secures in place the lead-in wires 53 and 55 and the support wire 63, while the lower bridge block secures in place the lead-in wires 53 and 55 and the support wire 61. Like the lamp embodiment of FIGS. 2A, 2B and 2C, the filaments and interconnect wires and loops of this embodiment preferably are all formed from a single, continuous wire.

FIG. 8 is a schematic diagram of another illumination system in accordance with the invention, similar to that of FIG. 1, but including a reflector 73 more in the form of a near parabola rather than a near ellipsoid. In this system, the incandescent lamp 13 is again positioned with its filaments 25 surrounding the reflector's longitudinal axis 75 and near the reflector's focal point 77. Because of the nature of a parabola, emitted light impinging on the reflector is redirected along an axis substantially parallel with the reflector's longitudinal axis. A beam thereby is projected without the need for a gate or collimating lens. A lens 19 optionally may be used to alter the beam's divergence or spread or to integrate the beam and thereby provide a desired intensity distribution.

The illumination system of FIG. 8 advantageously uses lamps 13 or 13' having the same filament geometry as those described above with respect to the illumination system of FIG. 1. Again, a high collection efficiency is provided by maximizing the proportion of light emitted in the direction of the reflector 73 rather than rearwardly, toward the lamp base 23, or forwardly, beyond the reflector but not through the lens 19, or outside the desired beam angle if no lens is employed.

The lamp embodiments described above are all adapted for use with reflectors that are separate components. It will be appreciated, however, that the lamps alternatively can have the reflectors incorporated directly into their glass bulbs. The geometric considerations described above with respect to the former kind of lamps are properly applicable to these latter kinds of lamps, as well.

It should be appreciated from the foregoing description that the present invention provides an improved incandescent lamp that is specially adapted for use in combination with a concave reflector in projecting a high-intensity beam of light. In each of several disclosed lamp embodiments, the lamp includes a plurality of linear, helically-wound filaments arranged with their longitudinal axes parallel with each other and spaced substantially uniformly around the lamp's central longitudinal axis. Orienting such a lamp with its longitudinal axis aligned with the reflector's longitudinal axis, and with the filaments near the reflector's general focal point, ensures that a high proportion of the emitted light is collected by the reflector to produce the beam.

Although the invention has been described in detail with reference to the presently preferred embodiments, those of ordinary skill in the art will appreciate that various modifications will be made without departing from the invention. Accordingly, the invention is defined only by the following claims.

I claim:

1. An incandescent illumination system for projecting a beam of light, comprising:

a concave reflector configured to be substantially symmetrical about a longitudinal axis; and an incandescent lamp including a plurality of linear, helically-wound filaments arranged with their longitudinal axes substantially parallel with, and spaced substantially symmetrically around, the longitudinal axis of the concave reflector;

wherein a substantial portion of the light emitted by the lamp impinges on, and is redirected by, the reflector to project a beam of light [substantially parallel with the longitudinal axis of the reflector].

2. An incandescent illumination system for projecting a beam of light, comprising:

a concave reflector configured to be substantially symmetrical about a longitudinal axis; and an incandescent lamp including four linear, helically-wound filaments arranged with their longitudinal axes substantially parallel with, and in a substantially square pattern symmetrically around, the longitudinal axis of the concave reflector;

wherein a substantial portion of the light emitted by the lamp impinges on, and is redirected by, the reflector to project a beam of light [substantially parallel with the longitudinal axis of the concave reflector].

3. An incandescent illumination system as defined in claim 2, wherein the four linear, helically-wound filaments of the incandescent lamp are electrically arranged in series with each other, with the first and last series-connected filaments being physically arranged diagonally opposite each other in the substantially square pattern.

4. An incandescent illumination system as defined in claim 2, wherein the plurality of linear, helically-wound filaments all have a uniform, substantially constant diameter.

5. An incandescent illumination system as defined in claim 1, wherein the incandescent lamp includes three linear, helically-wound filaments arranged with their longitudinal axes substantially parallel with, and in a substantially equilateral triangle pattern symmetrically around the, the longitudinal axis of the concave reflector.

6. An incandescent illumination system as defined in claim 5, wherein the plurality of linear, helically-wound filaments all have a uniform, substantially constant diameter.

7. An incandescent illumination system as defined in claim 1, wherein:

the plurality of linear, helically-wound filaments have substantially the same lengths and are located substantially equidistant, longitudinally, from the concave reflector; and the plurality of linear, helically-wound filaments are arranged such that the furthest distance across the filaments, in a direction transverse to their longitudinal axes, is substantially the same as, or less than, the lengths of the filaments in a direction along their longitudinal axes.

8. An incandescent illumination system as defined in claim 1, wherein:

the incandescent lamp further includes a transparent glass bulb and a base through which electrical power to the plurality of filaments is provided; and the reflector is secured directly to a portion of the transparent glass bulb.

9. An incandescent lamp comprising:

a transparent glass bulb having a central longitudinal axis; and four linear, helically-wound filaments located within the bulb and arranged with their longitudinal axes substantially parallel with each other and spaced in a substantially square pattern symmetrically around the central longitudinal axis of the lamp.

10. An incandescent lamp as defined in claim 9, wherein the four linear, helically-wound filaments are electrically arranged in series with each other, with the first and last series-connected filaments being physically arranged diagonally opposite each other in the substantially square pattern.

11. An incandescent lamp comprising:

a transparent glass bulb having a central longitudinal axis; and four or more linear, helically-wound filaments located within the bulb and arranged with their longitudinal axes substantially parallel with each other and spaced substantially symmetrically around the central longitudinal axis;

wherein the four or more linear, helically-wound filaments all have a uniform, substantially constant diameter;

and wherein the four or more linear, helically-wound filaments are spaced from each other by a distance substantially the same as, or less than, their diameters.

12. An incandescent lamp comprising:

a transparent glass bulb having a central longitudinal axis; and four or more linear, helically-wound filaments located within the bulb and arranged with their longitudinal axes substantially parallel with each other and spaced substantially symmetrically around the central longitudinal axis;

wherein the four or more linear, helically-wound filaments are coextensive and have substantially the same lengths;

and wherein the four or more linear, helically-wound filaments are arranged such that the furthest distance across the filaments in a direction transverse to their longitudinal axes is substantially the same as, or less than, the lengths of the filaments along their longitudinal axes.

13. An incandescent illumination system for projecting a beam of light, comprising:

a concave reflector configured to be substantially symmetrical about a longitudinal axis; and an incandescent lamp including four linear, helically-wound filaments arranged with their longitudinal axes substantially parallel with the longitudinal axis of the concave reflector, in a substantially square pattern symmetrically around the longitudinal axis of the reflector;

a gate having an aperture aligned with the longitudinal axis of the concave reflector; and a lens aligned with the longitudinal axis of the concave reflector and positioned on the side of the gate opposite the reflector and the incandescent lamp;

wherein a substantial portion of light emitted by the filaments of the incandescent lamp is directed generally perpendicular to the longitudinal axis of the concave reflector to impinge on the reflector, which redirects the light through the gate to the lens, to project the beam of light;

wherein the four linear, helically-wound filaments of the incandescent lamp are electrically arranged in series with each other, with the first and last series-connected filaments being physically arranged diagonally opposite each other in the substantially square pattern;

and wherein the four linear, helically-wound filaments have substantially the same lengths and are located substantially equidistant, longitudinally, from the concave reflector, and the four linear, helically-wound filaments are arranged such that the furthest diagonal distance across the filaments in a direction transverse to their longitudinal axes is substantially the same as the lengths of the filaments along their longitudinal axes.

14. An incandescent illumination system as defined in claim 1, wherein:

the plurality of helically-wound filaments each have a plurality of coils of filament wire of a predetermined wire diameter; and the plurality of helically-wound filaments are each wound with a substantially uniform spacing between adjacent coils of not more than 40% of the predetermined wire diameter.

15. An incandescent illumination system as defined in claim 1, wherein:

the plurality of helically-wound filaments each have a plurality of coils of filament wire of a predetermined wire diameter; and the plurality of helically-wound filaments are each wound with a substantially uniform spacing between adjacent coils selected to be just beyond a distance at which arcing between adjacent coils can occur.

16. An incandescent lamp comprising:

a transparent glass bulb having a central longitudinal axis; and four or more linear, helically-wound filaments located within the bulb and arranged with their longitudinal axes substantially parallel with each other and spaced substantially symmetrically around the central longitudinal axis;

wherein the four or more linear, helically-wound filaments each have a plurality of coils of filament wire of a predetermined wire diameter;

and wherein the four or more linear, helically-wound filaments are each wound with a substantially uniform spacing between adjacent coils of not more than 40% of the predetermined wire diameter.

17. An incandescent lamp comprising:

a transparent glass bulb having a central longitudinal axis; and four or more linear, helically-wound filaments located within the bulb and arranged with their longitudinal axes substantially parallel with each other and spaced substantially symmetrically around the central longitudinal axis;

wherein the four or more linear, helically-wound filaments each have a plurality of coils of filament wire of a predetermined wire diameter:

and wherein the four or more linear, helically-wound filaments are each wound with a substantially uniform spacing between adjacent coils selected to be just beyond a distance at which arcing between adjacent coils can occur.

* * * * *